(12) United States Patent
Arend et al.

(10) Patent No.: US 11,541,914 B2
(45) Date of Patent: Jan. 3, 2023

(54) MULTI-PART TREAD STRIP

(71) Applicant: Gebr. Bode GmbH & Co. KG, Kassel (DE)

(72) Inventors: Ulrich Arend, Dickershausen (DE); Christoph Theis, Bad Wildungen (DE)

(73) Assignee: GEBR. BODE GMBH & CO. KG, Kassel (DE)

( * ) Notice: Subject to any disclaimer, the term of this patent is extended or adjusted under 35 U.S.C. 154(b) by 61 days.

(21) Appl. No.: 16/925,797

(22) Filed: Jul. 10, 2020

(65) Prior Publication Data

US 2021/0009171 A1 Jan. 14, 2021

(30) Foreign Application Priority Data

Jul. 11, 2019 (DE) .................. 20 2019 103 832.2
Apr. 30, 2020 (DE) .................. 20 2020 102 430.2

(51) Int. Cl.
*B61D 23/00* (2006.01)
*B61D 17/10* (2006.01)

(52) U.S. Cl.
CPC ............. *B61D 23/00* (2013.01); *B61D 17/10* (2013.01); *E05Y 2900/506* (2013.01)

(58) Field of Classification Search
CPC ........ B61D 23/00; B61D 17/10; B61D 23/02; E05Y 2900/506; B60R 3/02; B60R 3/002; B60R 3/00; A61G 3/067
See application file for complete search history.

(56) References Cited

U.S. PATENT DOCUMENTS

| | | | |
|---|---|---|---|
| 6,186,733 B1 * | 2/2001 | Lewis | A61G 3/061 414/537 |
| 8,016,309 B2 * | 9/2011 | Flajnik | B60R 3/002 280/169 |
| 8,397,329 B2 * | 3/2013 | Just | A61G 3/067 14/73.1 |
| 9,597,240 B2 * | 3/2017 | Hermanson | A61G 3/0808 |
| 10,167,001 B2 * | 1/2019 | Kondyra | B61D 47/00 |
| 2005/0110293 A1 * | 5/2005 | Tan | B62D 33/037 296/26.09 |

(Continued)

FOREIGN PATENT DOCUMENTS

DE  9305299 U1  6/1993
DE  202006017716 U1  7/1993

(Continued)

*Primary Examiner* — Mark T Le
(74) *Attorney, Agent, or Firm* — Cantor Colburn LLP

(57) ABSTRACT

A tread strip for a vehicle is formed of at least two parts, an inner part and an outer part. The inner part is configured for attachment to the vehicle and/or to an outer part. The outer part is configured for attachment to the inner part and/or the vehicle. The outer part further includes an intermediate portion extending along a longitudinal axis between two attachment portions, the two attachment portions being configured for attachment to the inner part. The inner part has an intermediate portion extending along the longitudinal axis between two end portions. The end portions are configured for attachment of the inner part to the vehicle and/or for attachment to the outer part. The tread strip may be mounted to a vehicle by attaching the inner part and then attaching the outer part to the inner part and/or sealing the inner part with respect to the vehicle.

10 Claims, 10 Drawing Sheets

(56) References Cited

U.S. PATENT DOCUMENTS

2017/0044819 A1  2/2017  Krueger

FOREIGN PATENT DOCUMENTS

| DE | 20318186 U1 | 7/2004 | |
|---|---|---|---|
| DE | 102010033983 A1 | 2/2012 | |
| DE | 102014208288 A1 | 11/2015 | |
| DE | 102014210783 A1 | 12/2015 | |
| DE | 102015203301 A1 | 8/2016 | |
| DE | 102017126948 A1 | 5/2019 | |
| EP | 3213973 A1 | 9/2017 | |
| WO | WO-2005108161 A1 * | 11/2005 | ............. B60P 1/431 |

* cited by examiner

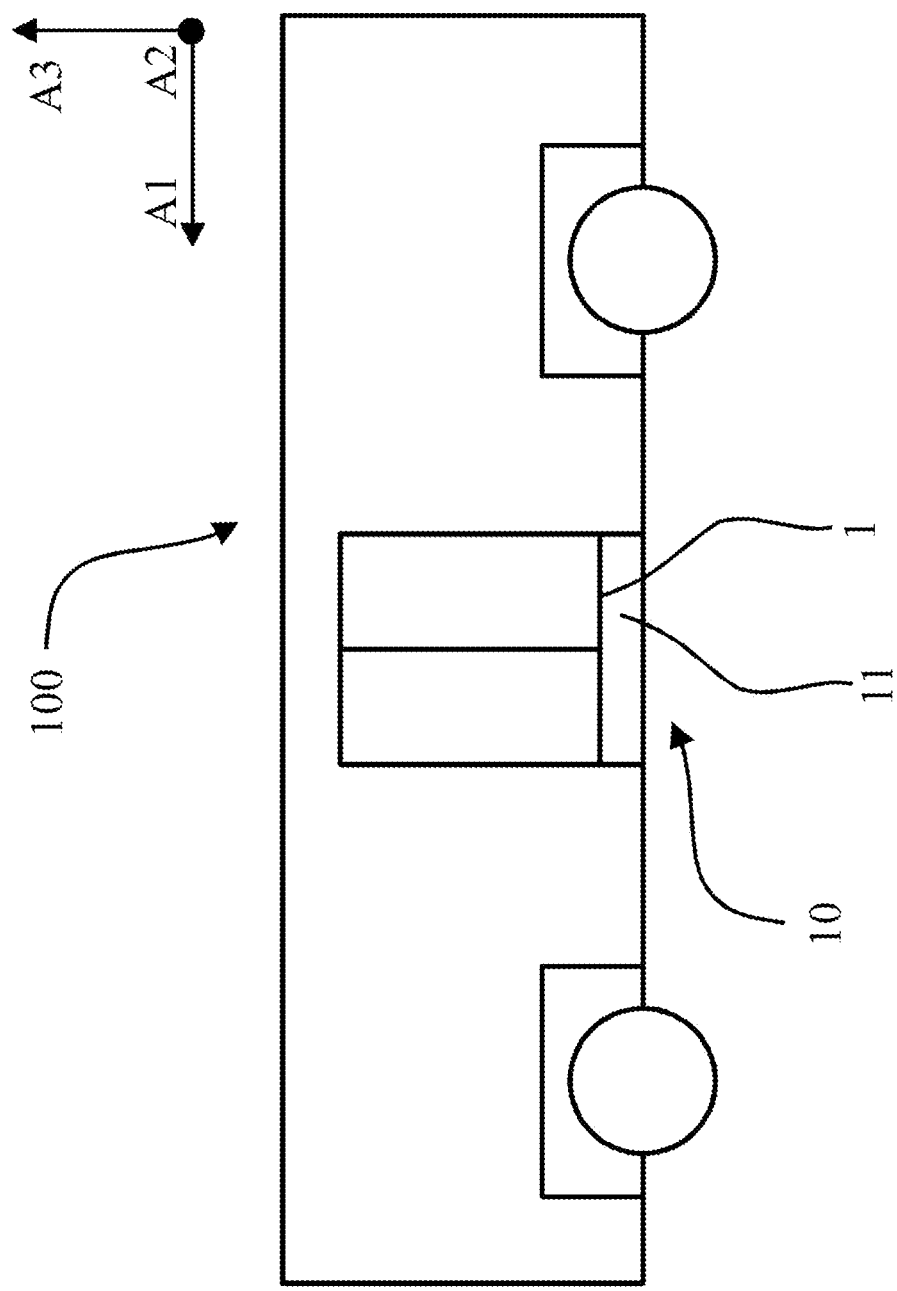

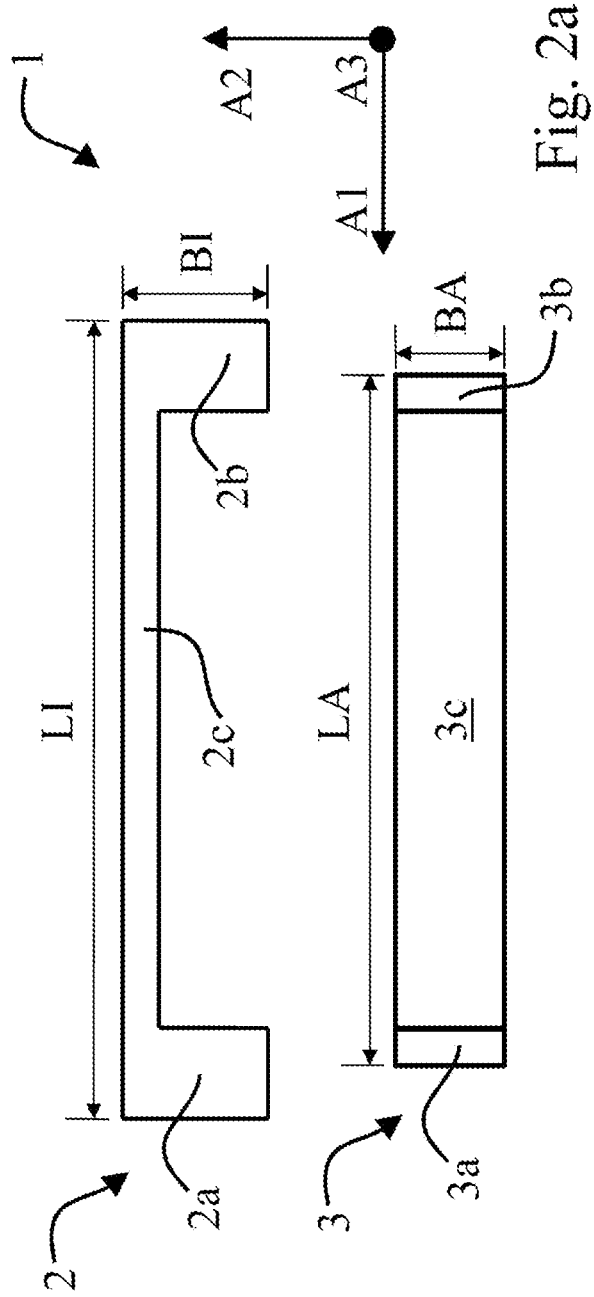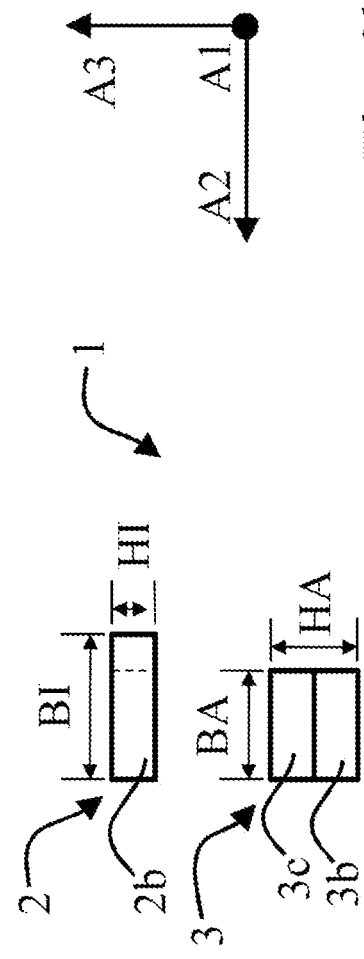

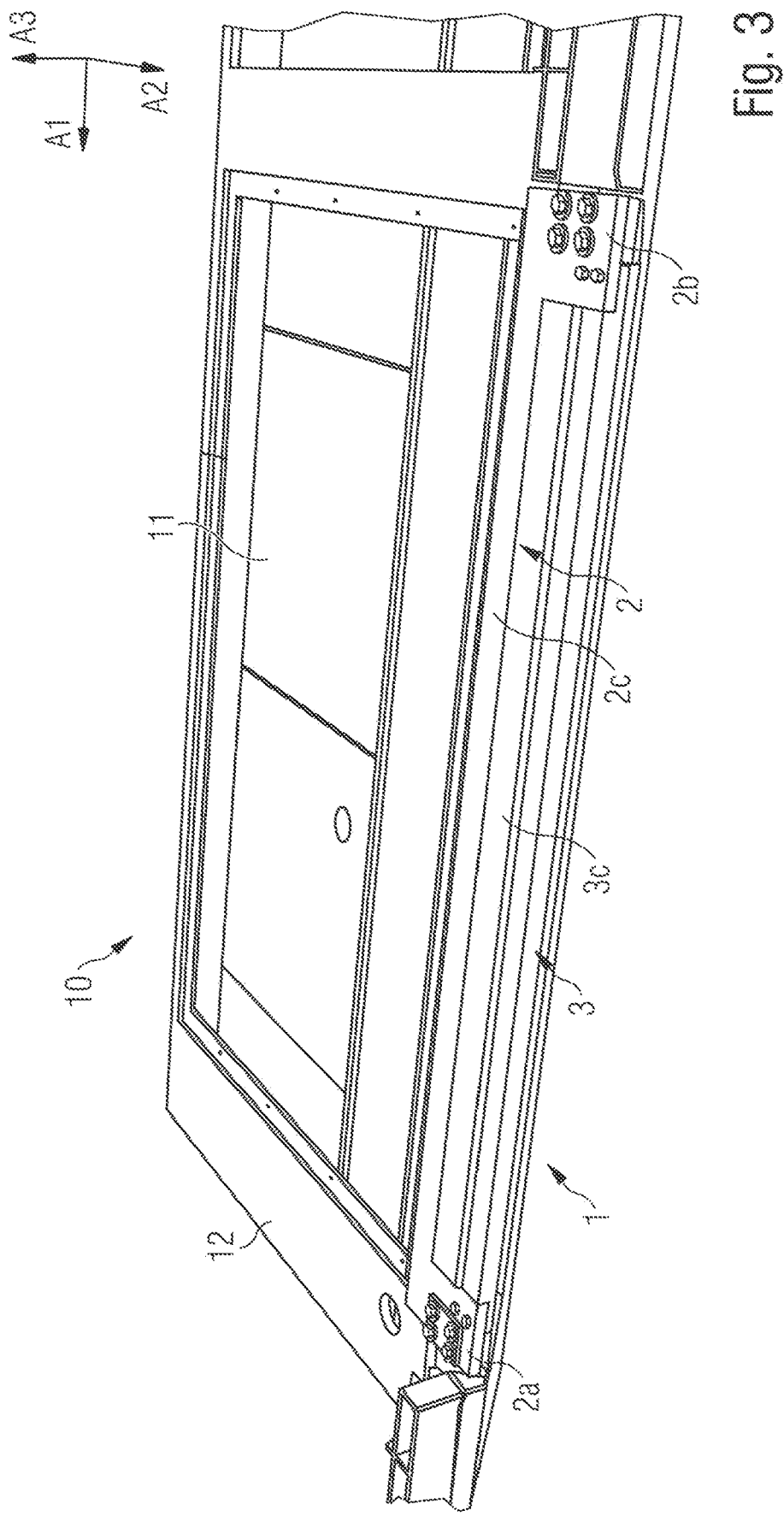

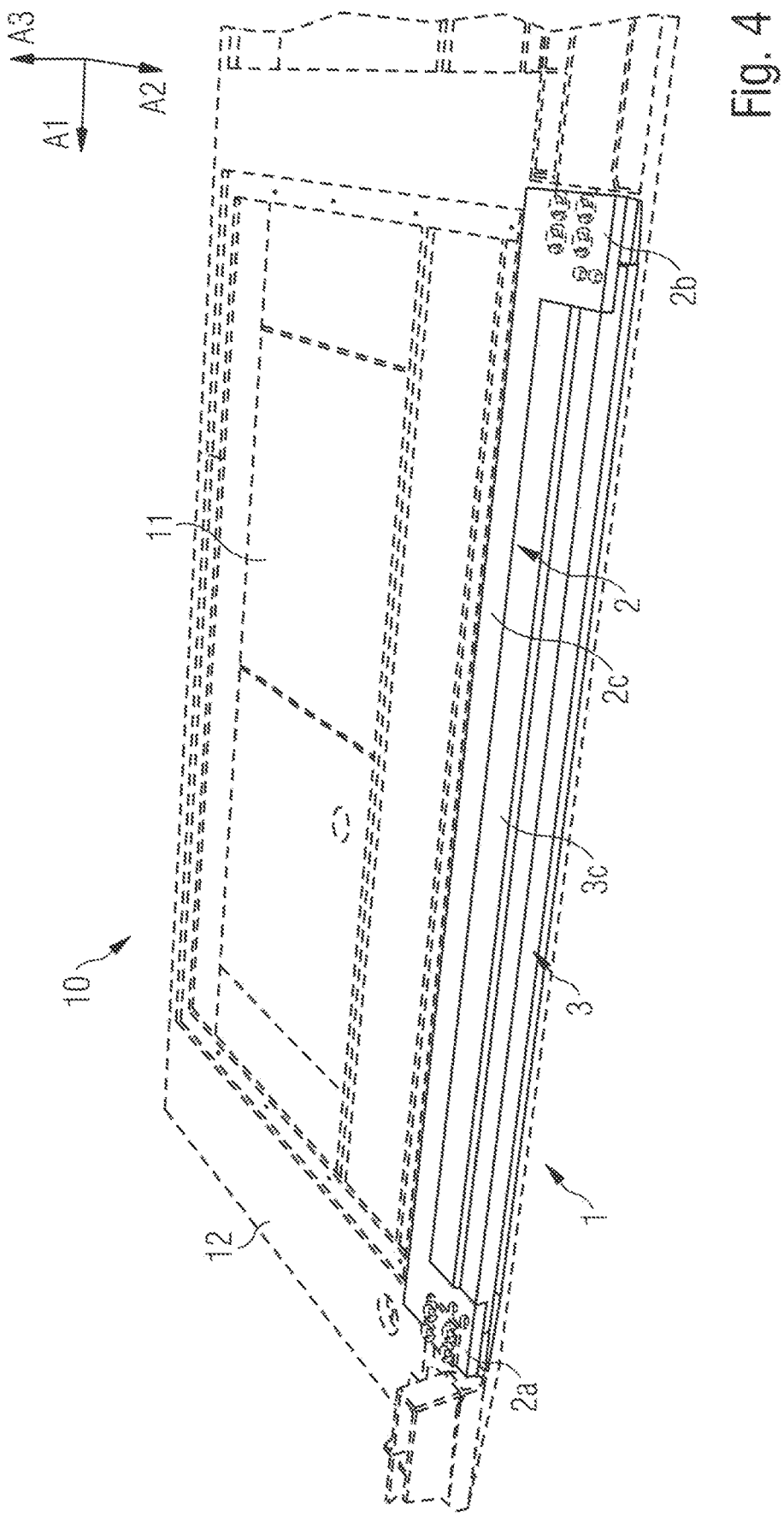

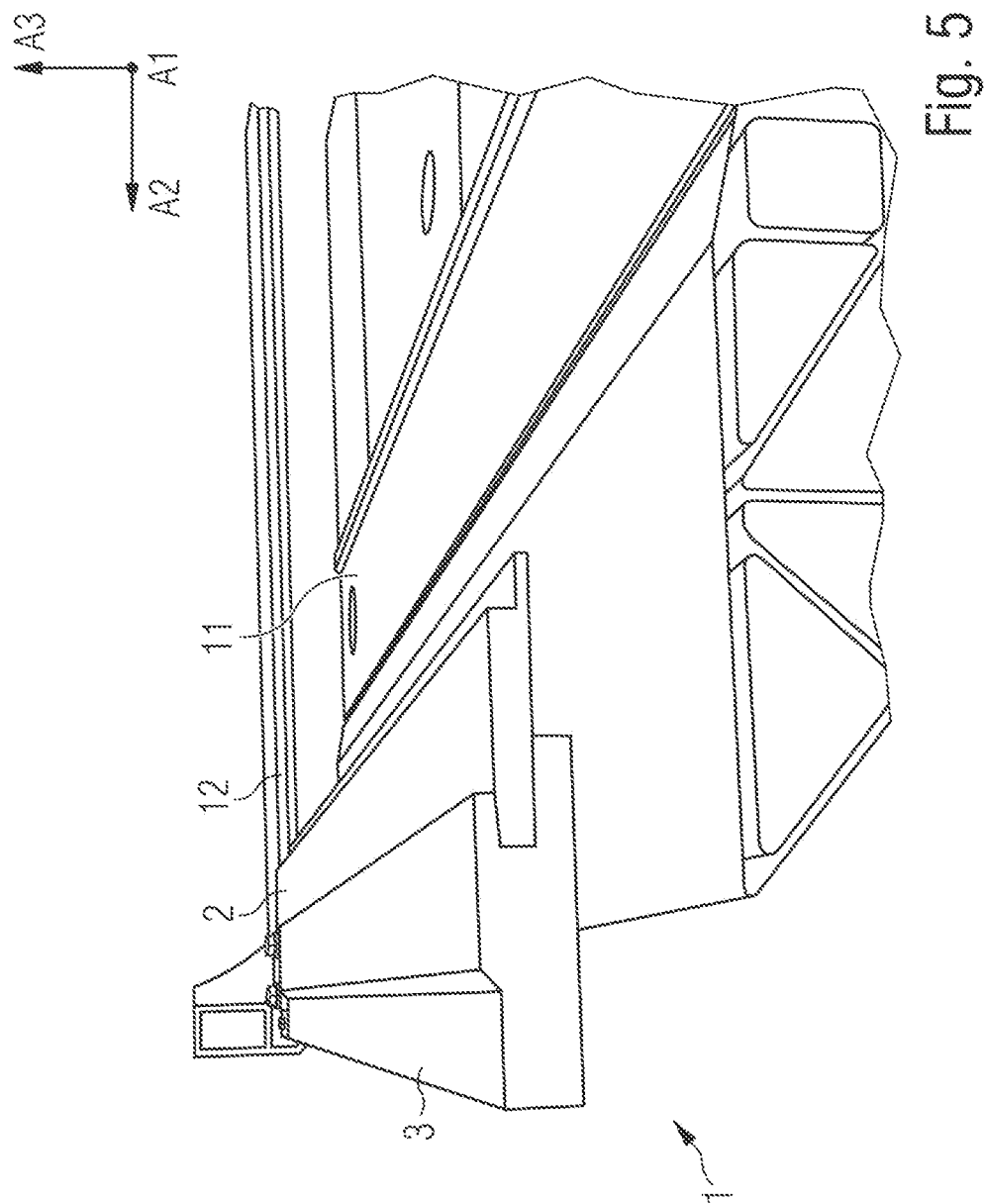

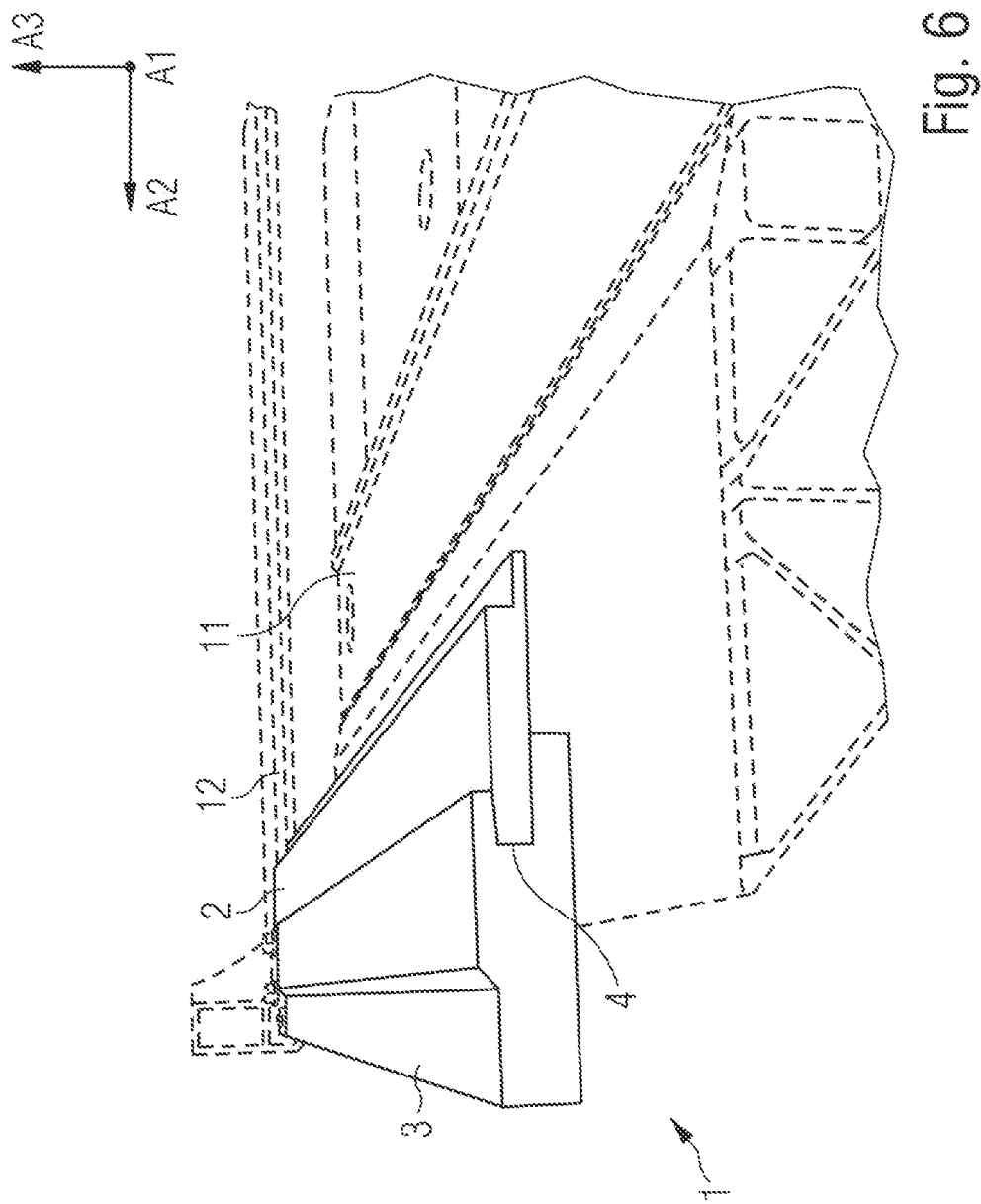

MULTI-PART TREAD STRIP

CROSS REFERENCE TO RELATED APPLICATIONS

This application is related to and claims the benefit of German Patent Application No. 202019103832.2, filed on Jul. 11, 2019, and German Patent Application No. 202020102430.2, filed on Apr. 20, 2020, the contents of which are herein incorporated by reference in their entirety.

TECHNICAL FIELD

The disclosure relates to vehicles for transporting people and/or goods, in particular to public transport vehicles, such as trains and buses. Public transport vehicles are, for example, motor vehicles, e.g. buses for regular inner-city service, or rail-bound vehicles, such as S-trains, regional trains, inter-city trains or express trains.

BACKGROUND

Along a longitudinal axis, such vehicles have a main extent in the direction of travel. Transverse to the direction of travel, door systems, which enable the people to be transported to embark and disembark, or the goods to be transported to be loaded and unloaded, are disposed in the side walls of the vehicles. Starting from a floor plane of such vehicles, door systems of this kind, in the mounted state, extend upwards substantially in the orthogonal direction.

In the region of the respective door system, a sliding tread system is usually disposed underneath the floor of such vehicles. The sliding tread system makes it easier for the people to be transported to embark and disembark, or for the goods to be transported to be loaded and unloaded. To this end, the sliding tread system is configured for compensating, during operation, a horizontal distance and/or a vertical height difference of a vehicle e.g. with respect to a platform, a road, a sidewalk and/or a loading and unloading level. Known sliding tread systems include an extending portion with which the horizontal and/or vertical distance is compensated in operation. The extending portion is configured, for example, as a ramp, as a sliding-lifting tread and/or with multiple steps. The sliding tread system is also referred to as a sliding tread cassette.

The sliding tread system is usually mounted on the vehicles underneath a tread strip by means of a mounting frame. In operation, the extending portion of the sliding tread system extends underneath the tread strip in a direction transverse to the longitudinal axis in order to compensate the horizontal distance and/or a vertical height difference. Extending the extending portion includes a rotary and/or translational sequence of movements of the extending portion, e.g. a folding of the ramp or a pivoting and/or translational moving of the sliding-lifting tread. For extending the extending portion, the sliding tread system usually includes a driving unit.

The tread strip closes off the floor of the vehicles towards the outside or towards the vehicle interior and towards the door system in the region of the mounted sliding tread system. For this purpose, the tread strip is generally attached at its ends to the vehicles. To this end, the tread strip attached to the vehicle is sealed with respect to the vehicle while the tread strip is first mounted. For example, the tread strip is sealed with respect to the vehicle by means of a sealing compound. Such a tread strip, which is sealed and attached to the vehicle, cannot be detached for maintenance work without destroying the seal. Thus, it is preferred not to detach the tread strip for maintenance work in order to minimize maintenance expenditure.

The tread strip has to absorb resulting loads of the people and/or goods to be transported. The loads arise particularly when the people to be transported embark and disembark or the goods to be transported are loaded and unloaded. In order to ensure a sufficient strength of the tread strip or limit bending of the tread strip, the tread strip is designed in a massive manner. In particular, in the mounted state, the tread strip is designed in a massive manner substantially in the orthogonal direction to the floor plane of the vehicle. However, such a massively configured and sealed tread strip connected to the vehicle prevents the removal of the sliding tread system for maintenance purposes without destroying the seal.

Most frequently, this space underneath the floor of the vehicle in the region of the door system—where the respective sliding tread system is to be mounted—is very limited, so that the sliding tread system cannot be pushed in as a whole cassette for mounting but has to be mounted from the inside of the vehicle through the floor plane of the vehicles. In particular for maintenance work on the sliding tread system, the sliding tread system has to be detached and mounted again from inside the vehicle. This manner of mounting and maintaining the sliding tread system is laborious.

In order to mount the sliding tread system as a whole cassette, i.e. as a complete unit, underneath the tread strip, it is necessary to enlarge the vertical space for mounting/maintenance. However, tread strips according to the current state of the art have a single-part configuration, so that the vertical space for mounting/maintenance in the direction of known tread strips cannot be enlarged. Document DE 10 2014 210 783 A1, for example, shows such a single-part tread strip, with a sliding tread housing adjacent thereto towards the inside of a rail vehicle. An angled, metallic, single-part tread strip or metallic, strip-like, single-part tread strip is known from DE 10 2015 203 301 A1. In particular, it is desirable if the tread strip, which is sealed for the purpose of sealing when it is first mounted, is not detached during maintenance work.

Thus, the disclosure provides an apparatus that makes it easier to mount the sliding tread system. Moreover, the disclosure provides an apparatus to reduce the maintenance expenditure of the sliding tread system. In particular, the disclosure provides an apparatus to reduce the mounting costs and/or maintenance costs of the sliding tread system.

According to a first aspect of the disclosure, the advantages of the disclosure are achieved by providing a tread strip for a vehicle including at least two parts is provided. Thus, the tread strip according to the disclosure is at least a two-part tread strip. A first part of the at least two parts of the tread strip is not designed as a force-absorbing part; in contrast, a second part of the at least two parts of the tread strip is designed as a force-absorbing part.

Furthermore, the force-absorbing part forms a sealing interface towards the door leaves; the other inner part serves for sealing with respect to the vehicle interior.

Relative to the vehicle or to the door opening, the first part forms an inner part with a reduced strength, which is sealed with respect to the floor when it is first mounted. It therefore does not form the force-absorbing part.

The second, outer part is configured to be more rugged and can be easily detached when the sliding tread cassette is mounted and removed, because it is not glued or sealed to the vehicle floor. It therefore forms the force-absorbing part.

By removing the force-absorbing part, it is possible to mount and detach the sliding tread underneath the tread strip as a whole cassette.

The two tread strip parts can be connected to each other by a positive fit and by means of a screw connection.

By mounting the entire tread underneath the tread strip from the outside, mounting is made much easier and the floor in the vehicle can be given a simpler configuration.

According to a first preferred embodiment, the tread strip is characterized in that the at least two parts of the tread strip include an inner part configured for attachment to the vehicle and/or to an outer part, and the outer part configured for attachment to the inner part and/or the vehicle.

In particular, the inner part is configured for the non-positive and/or positive attachment to the vehicle. Furthermore, the inner part is preferably configured for the non-positive and/or positive attachment to the outer part. In particular, the outer part is configured for the non-positive and/or positive attachment to the inner part. It may be preferred that the outer part is configured for attachment to the vehicle. In particular, the outer part can be configured for the non-positive and/or positive attachment to the vehicle.

Preferably, the non-positive attachment is a screw connection. In particular, an inner part and/or outer part configured for non-positive attachment has accommodating attachment portions for a screw connection. Preferably, the accommodating attachment portions are through holes. Furthermore, the accommodating attachment portions may preferably include a thread, in particular a female thread. Preferably, the accommodating attachment portions extend along an attachment axis which, in the mounted state of the tread strip, extends substantially orthogonally to the longitudinal axis of the vehicle. In particular, the attachment axis extends substantially orthogonally to the floor of the vehicle in the mounted state of the tread strip. Moreover, the accommodating attachment portions may include attachment members. Attachment members are screws, bolts or rivets, for example.

The inner part is, in particular, the first part of the tread strip. The outer part is, in particular, the second part of the tread strip.

As the material, the at least two parts of the tread strip include, in particular, metal, e.g. preferably steel and/or aluminum, and/or plastic. In particular, the inner part and the outer part have the same material. Moreover, it may be preferred if the outer part includes a material having a greater strength and/or greater bending stiffness than the material which the inner part comprises. Furthermore, it may be preferred that the at least two parts of the tread strip comprise a fiber composite material.

Such an embodiment advantageously facilitates mounting the sliding tread system. In particular, the maintenance expenditure of the sliding tread system is reduced. As a consequence, the mounting costs and/or maintenance costs of the sliding tread system are reduced.

According to another preferred embodiment of the tread strip, the outer part has an intermediate portion extending along a longitudinal axis between two attachment portions, the two attachment portions being configured for attachment to the inner part.

The two attachment portions are configured for the non-positive and/or positive attachment to the vehicle and/or the inner part. In particular, the two attachment portions include the accommodating attachment portions for attachment, particularly for a screw connection, to the vehicle and/or the inner part. Preferably, the outer part may be attached to the vehicle and/or the inner part with through bolts and a nut. In particular, the outer part is configured for a detachable connection to the inner part and/or the vehicle. Moreover, the attachment portions may include attachment members. Attachment members are screws, bolts or rivets, for example.

In another preferred embodiment of the tread strip, the inner part has an intermediate portion extending along the longitudinal axis between two end portions, the end portions of the inner part being configured for the attachment of the inner part to the vehicle and/or for attachment to the outer part.

The two end portions of the inner part are configured for the non-positive and/or positive attachment of the inner part to the vehicle and/or the outer part. In particular, the two end portions include the accommodating attachment portions for attachment, particularly for a screw connection, to the vehicle and/or the outer part. Preferably, the inner part may be attached to the vehicle and/or the outer part with through bolts and a nut. In particular, the inner part is configured for a detachable connection to the outer part and/or the vehicle.

According to another preferred embodiment of the tread strip, the latter is characterized in that the inner part has an inner-part length along the longitudinal axis, an inner-part width along a transverse axis and an inner-part height along a vertical axis, wherein, preferably, the inner-part length is greater than the inner-part width, and the inner-part width is greater than the inner-part height, wherein the inner-part width of the two end portions is, in particular, greater than the inner-part width of the intermediate portion.

The longitudinal axis extends in the traveling direction of the vehicle on which the tread strip is to be mounted for operation. The transverse axis extends orthogonally to the longitudinal axis between the side walls in a horizontal plane. The vertical axis extends orthogonally to the longitudinal axis orthogonally to the floor of the vehicle in a substantially vertical plane.

The inner-part width may vary along the longitudinal axis and/or along the vertical axis. Furthermore, it may be preferred if the inner-part width is constant along the longitudinal axis and/or along the vertical axis.

The inner-part length may vary along the transverse axis and/or along the vertical axis. Furthermore, it may be preferred if the inner-part length is constant along the transverse axis and/or along the vertical axis.

The inner-part height may vary along the transverse axis and/or along the longitudinal axis. Furthermore, it may be preferred if the inner-part height is constant along the transverse axis and/or along the longitudinal axis.

In particular, the inner part has a U-shaped configuration.

Such a preferred embodiment permits a particularly simple, quick and cost-effective (first) mounting and maintenance of the tread strip and the sliding tread system.

According to another preferred embodiment, the outer part has an outer-part length along the longitudinal axis, an outer-part width along the transverse axis and an outer-part width along the vertical axis. Preferably, the outer-part length is greater than the outer-part width, and the outer-part width is greater than the outer-part height, wherein the inner-part width of the two end portions of the inner part is greater than the outer-part width of the outer part.

The outer-part width may vary along the longitudinal axis and/or along the vertical axis. Furthermore, it may be preferred if the outer-part width is constant along the longitudinal axis and/or along the vertical axis.

The outer-part length may vary along the transverse axis and/or along the vertical axis. Furthermore, it may be preferred if the outer-part length is constant along the transverse axis and/or along the vertical axis.

The outer-part height may vary along the transverse axis and/or along the longitudinal axis. Furthermore, it may be preferred if the outer-part height is constant along the transverse axis and/or along the longitudinal axis.

In particular, the outer-part height of the attachment portions of the outer part is smaller than the outer-part height of the intermediate portion of the outer part.

Such a preferred embodiment permits a particularly simple, quick and cost-effective (first) mounting and maintenance.

According to another preferred embodiment of the tread strip, the outer part has an accommodating groove for accommodating the inner part.

The accommodating groove has a groove length along the longitudinal axis, a groove depth along the transverse axis, and a groove height along the vertical axis. Preferably, the groove length is greater than the groove height and greater than the groove width.

The groove length preferably corresponds to the outer-part length. In particular, the groove height may vary along the transverse axis. Preferably, the groove height decreases along the transverse axis. In particular, it is preferred that the groove height substantially corresponds to the inner-part height.

In particular, the accommodating groove is configured for the positive accommodation and attachment of the outer part to the inner part. In particular, the accommodating groove is configured so that the inner part is—at least partially—insertable into the accommodating groove.

Such a preferred embodiment permits a particularly simple, quick and cost-effective (first) mounting and maintenance. In particular, no tools are required for inserting the inner part into the accommodating groove of the outer part.

According to another preferred embodiment of the tread strip, the outer-part length of the outer part is smaller than the inner-part length of the inner part.

According to another preferred embodiment of the tread strip, the inner-part height of the inner part is smaller than the outer-part height of the outer part.

According to another preferred embodiment of the tread strip, it is provided that the at least two parts of the tread strip include at least one intermediate part, the at least one intermediate part being disposed between the inner part and the outer part.

In another preferred embodiment of the tread strip, the latter is characterized in that the inner part and the outer part are connected to each other non-positively and/or positively.

According to another preferred embodiment, the tread strip is characterized in that the inner part is configured as a single part and/or the outer part is configured as a single part.

According to a second aspect of the disclosure, an advantage is achieved by providing a sliding tread module is provided. The sliding tread module comprises a mounting frame for accommodating and attaching a sliding tread system to the vehicle, the sliding tread system and a previously described tread strip according to the first aspect of the disclosure, particularly according to one of the previously described preferred embodiments of the tread strip. In particular, the sliding tread module comprises a mounting frame for accommodating and attaching a sliding tread system to the floor of the vehicle.

According to a third aspect of the disclosure, an advantage is achieved by providing a vehicle comprising a previously described tread strip according to the first aspect of the disclosure, particularly according to one of the previously described preferred embodiments of the tread strip.

According to a fourth aspect of the disclosure, an advantage is achieved by providing a use of a previously described tread strip according to the first aspect of the disclosure, particularly according to one of the previously described preferred embodiments of the tread strip, for a vehicle is provided, in particular for a rail-bound vehicle and/or for a motor vehicle.

According to a fifth aspect of the disclosure, an advantage is achieved by providing a method for mounting a previously described tread strip according to the first aspect of the disclosure, particularly according to one of the previously described preferred embodiments of the tread strip, to a vehicle is provided. The method according to the disclosure is characterized by the steps:

Providing a vehicle, and

Providing a previously described tread strip according to the first aspect of the disclosure, particularly according to one of the previously described preferred embodiments of the tread strip, and Attaching an inner part of the tread strip to the vehicle, and Attaching an outer part of the tread strip to the inner part and/or Sealing the inner part with respect to the vehicle.

The step of providing a vehicle includes, in particular, providing a rail-bound vehicle and/or a motor vehicle.

With regard to the advantages, embodiments and configuration details of the further aspects of the disclosure and their developments, reference is also made to the previous description regarding the corresponding features of the tread strip according to the first aspect of the disclosure and its preferred embodiments.

BRIEF DESCRIPTION OF THE DRAWINGS

Preferred embodiments of the disclosure are described, by way of example, with reference to the attached Figures. In the Figures:

FIG. 1: shows a schematic representation of a preferred embodiment of a vehicle;

FIGS. 2*a*-2*b*: show schematic representations of a tread strip;

FIGS. 3-6: show a schematic representation of a tread strip completely mounted on the vehicle.

DETAILED DESCRIPTION OF THE DRAWINGS

Figure 7:
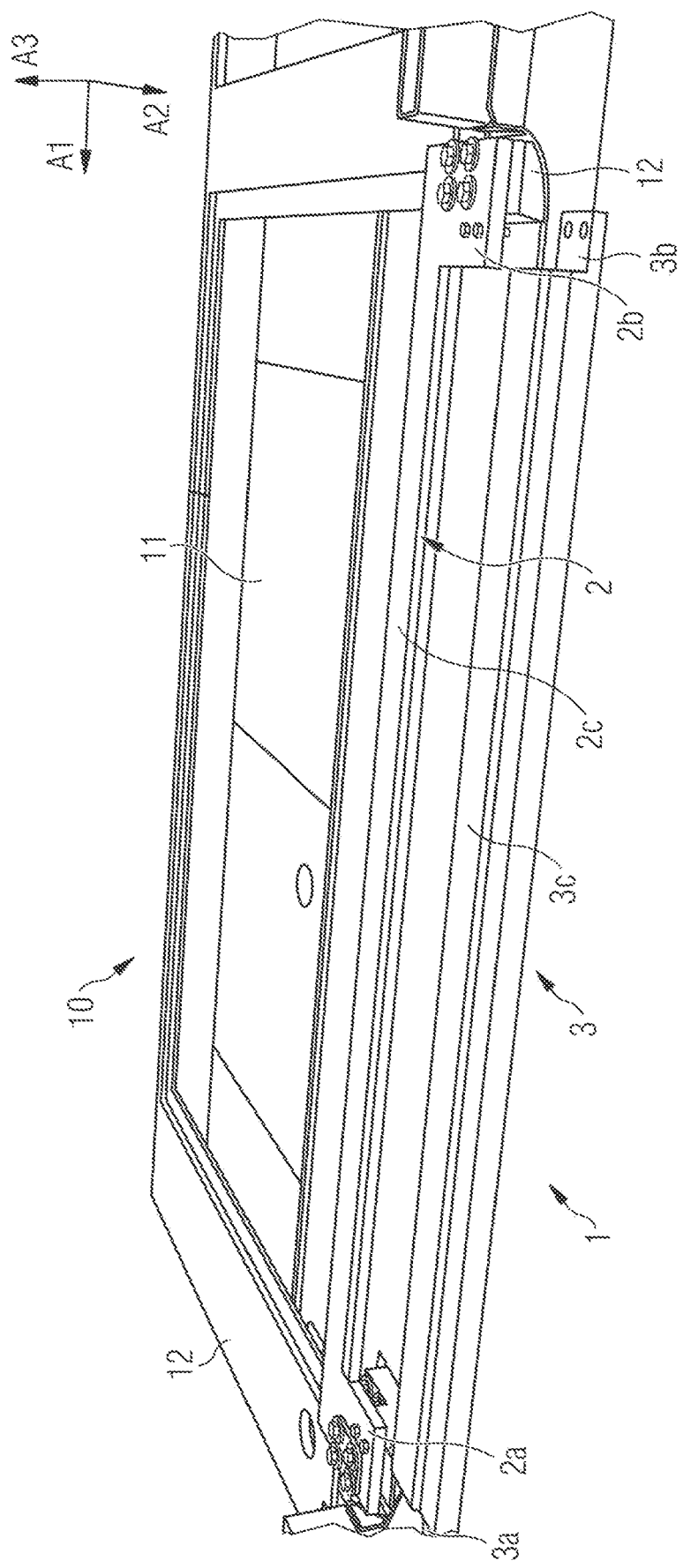
FIGS. 7-10: show a schematic representation of a tread strip partially mounted on the vehicle.

FIG. 1 shows a schematic representation of a preferred embodiment of a vehicle 100. The vehicle 100 has a main extending direction along a longitudinal axis A1. The vehicle 100 includes a sliding tread module 10 comprising a sliding tread system 11, which is mounted on the vehicle 100 underneath a tread strip 1 by means of a mounting frame 12 (not shown). In the mounted state, the tread strip 1 closes off the floor (not shown) of the vehicle 100 towards the outside and towards the door system disposed above the tread strip. The door system extends upwards along a vertical axis A3 substantially in the orthogonal direction to a floor plane which, in particular, the tread strip closes off towards the outside and towards the door system disposed above the tread strip.

FIGS. 2*a* and 2*b* show a schematic representation of a preferred embodiment of a tread strip 1 in a state of not being mounted on the vehicle 100. This tread strip 1 comprises an inner part 2 and an outer part 3.

In a top view, FIG. 2*a* shows the inner part 2, which has an inner-part length LI along the longitudinal axis A1. Along a transverse axis A2, the inner part 2 has an inner-part width BI which is smaller than the inner-part length LI. Along the longitudinal axis A1, the inner part 2 extends with an intermediate portion 2*c* between two end portions 2*a*, 2*b*. The intermediate portion 2*c* has a smaller inner-part width BI than the end portions 2*a*, 2*b* of the inner part 2. In this respect, the inner-part width BI of the inner part varies along the longitudinal axis A1. The schematic representation of the inner part 2 shown in FIG. 2*a* has a U-shaped configuration. The U-shaped inner part 2 is suitable for accommodating the outer part 3 non-positively and positively.

The outer part 3 shown schematically in a top view in FIG. 2*a* has an outer-part length LA along the longitudinal axis A1. Along a transverse axis A2, the outer part 3 has an outer-part width BA that is smaller than the outer-part length LA. Along the longitudinal axis A1, the outer part 3 extends between two attachment portions 3*a*, 3*b* with an intermediate portion 3*c*. In this preferred embodiment of the outer part 3, the outer-part width BA of the outer part 3 is constant along the longitudinal axis A1 and the vertical axis A3. In particular, the outer part 3 shown schematically in FIG. 2*a* has a slat-shaped or rod-shaped configuration.

The inner part 2 shown schematically in a side view in FIG. 2*b* has an inner-part height HI along the vertical axis A3. The inner-part height HI of this preferred embodiment of the inner part 2 is constant along the longitudinal axis A1 and the transverse axis A2.

The outer part 3 shown schematically in a side view in FIG. 2*b* has an outer-part height HA along the vertical axis A3. The outer-part height HA of the outer part 3 varies along the longitudinal axis A1. In this preferred embodiment, the outer-part height HA of the attachment portions 3*a*, 3*b* is smaller than the outer-part height HA of the intermediate portion 3*c* of the outer part 3. In this regard, the outer-part height HA varies along the longitudinal axis A1.

FIGS. 3-6 show schematic representations of a preferred embodiment of a sliding tread module 10. The sliding tread module 10 is attached to the vehicle 100 (not shown). The sliding tread module 10 comprises a mounting frame 12 on which a sliding tread system 11 and a tread strip 1 in a preferred embodiment are mounted.

Figure 8:
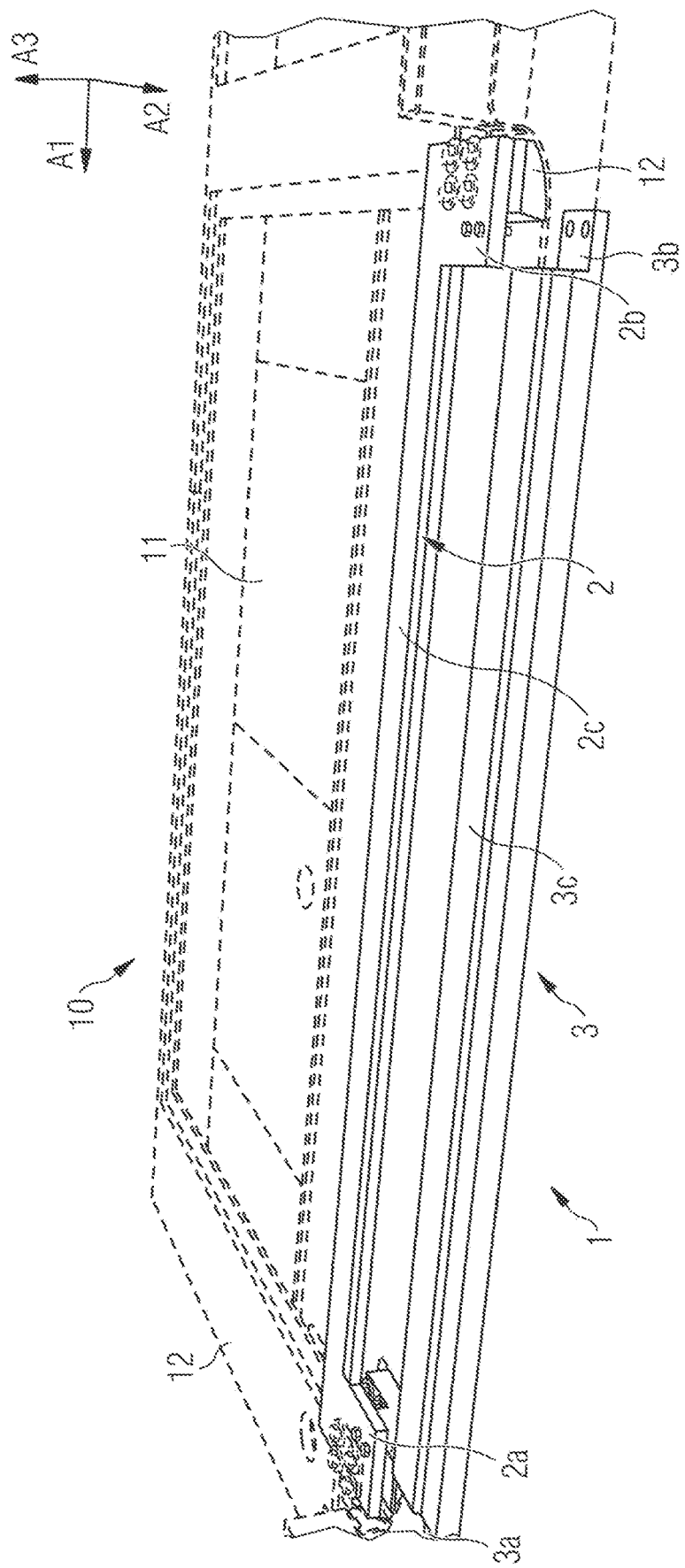
Figure 9:
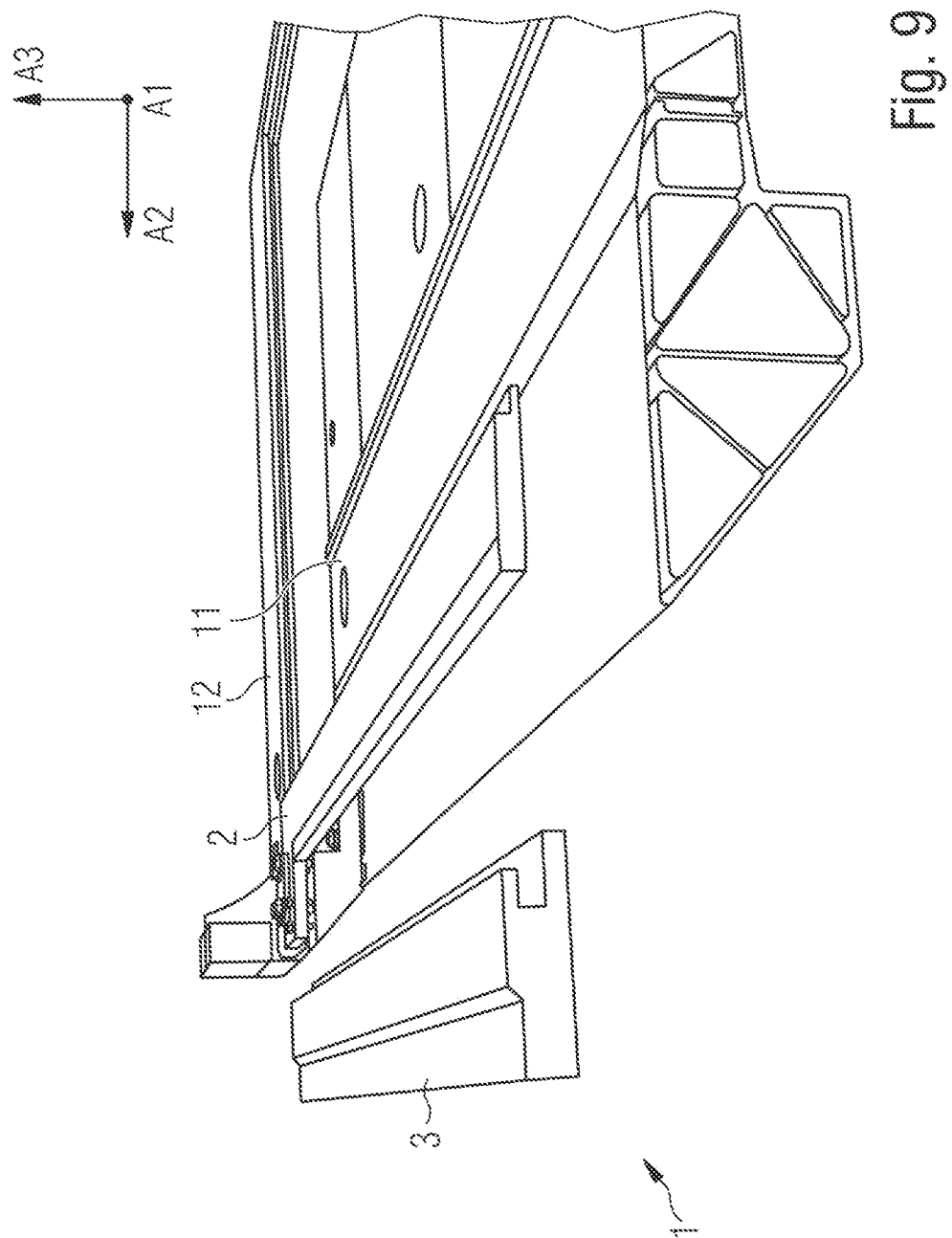
Figure 10:
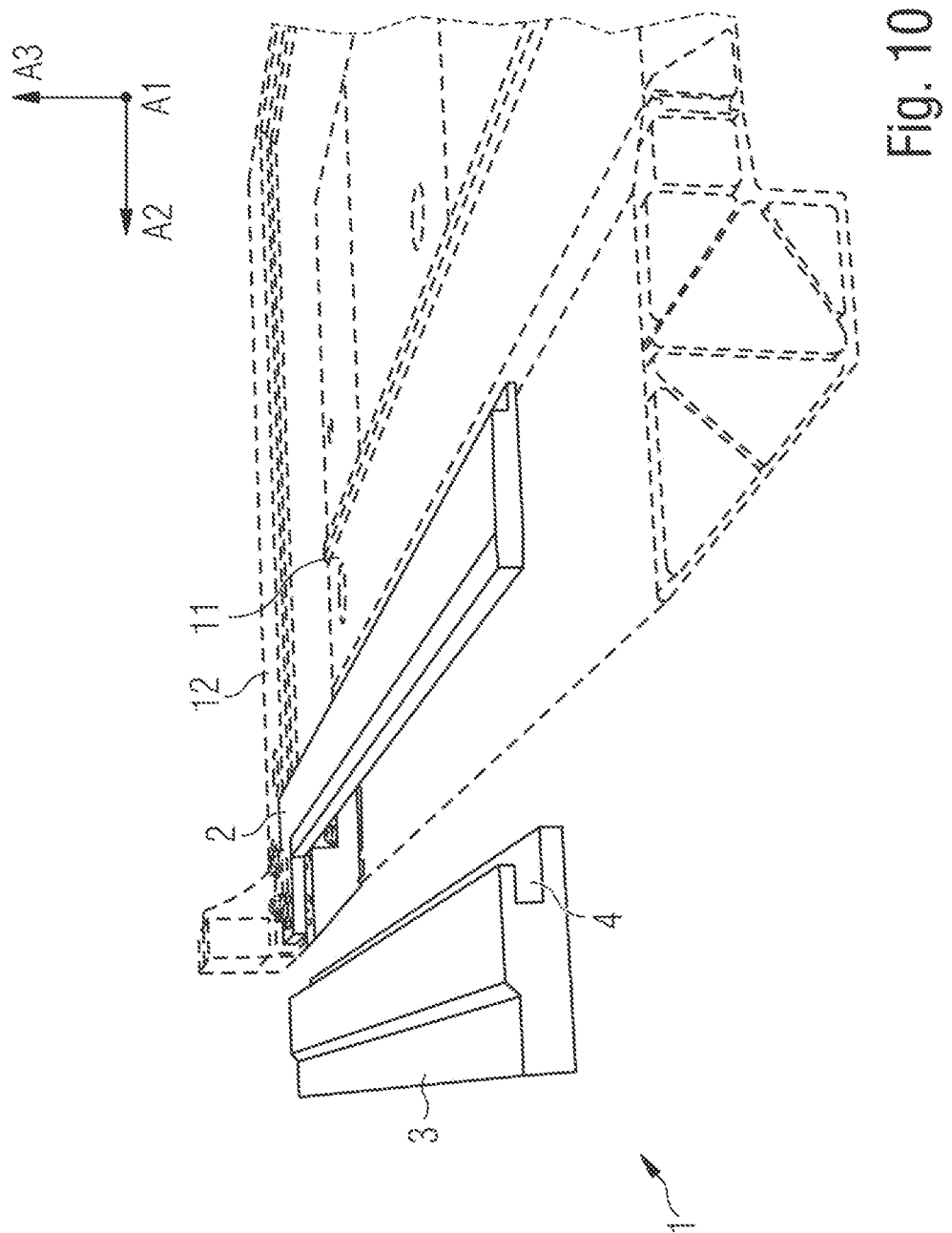

FIGS. 7-10 show schematic representations of the preferred embodiment of a sliding tread module 10 shown schematically in FIGS. 3-6, wherein the outer part 3 of the tread strip 1 is not mounted.

The preferred embodiment of the tread strip 1 shown schematically in FIGS. 3-10 includes an inner part 2 and an outer part 3.

The inner part 2 shown schematically in FIGS. 3-10 is substantially configured to correspond to the embodiment of the inner part 2 shown schematically in FIGS. 2*a*, 2*b*. The end portions 2*a*, 2*b* of the inner part 2 include accommodating attachment portions for screw connections for the non-positive attachment of the inner part 2 to the mounting frame 12 of the sliding tread system 11. In the direction of the vertical axis A3, the inner part 2 is placed on the mounting frame 12. In this respect, the inner part 2 is also positively connected to the vehicle 100 by means of the mounting frame 12 in at least one direction along the vertical axis A3.

The outer part 2 shown schematically in FIGS. 3-10 is substantially configured to correspond to the embodiment of the outer part 2 shown schematically in FIGS. 2*a*, 2*b*. The attachment portions 3*a*, 3*b* of the outer part 3 are configured to be non-positively attached to the inner part 2, in the present case by means of a screw connection. It is provided that the inner part 2 in this preferred embodiment comprises, in the respective end portion 2*a*, 2*b*, four through bores for accommodating screws. The screws are screwed to the mounting frame 12. It is also provided that the respective end portions 2*a*, 2*b* have two through bores as accommodating attachment portions in order to attach the outer part 3 to the inner part 2. The attachment portions 3*a*, 3*b* of the outer part 3 each include two bores with a female thread for attaching the outer part 3 to the inner part 2. It may also be preferred if attachment portions 3*a*, 3*b* of the outer part 3 comprise through bores without threads for attachment to the inner part 2.

Moreover, the outer part 3 has in this embodiment of the tread strip 1 preferred in the FIGS. 3-10 an accommodating groove 4, as the schematic cross-sectional view of the tread strip 1 in FIG. 5 shows, for example. In the fully mounted state of the tread strip 1, the inner strip 2 is positively inserted into the accommodating groove 4 of the outer part 3. A particularly rugged tread strip 1 and an easily mountable and detachable tread strip 1 is thus obtained. The accommodating groove 4 preferably extends along the longitudinal axis A1 with a groove length. The accommodating groove preferably has a constant groove depth in the direction of the transverse axis A2 and a constant groove height in the direction of the vertical axis A3.

The invention claimed is:

1. A tread strip for a vehicle, wherein the tread strip is formed of at least two parts;
   the at least two parts include an inner part configured for attachment to the vehicle and/or to an outer part, and the outer part configured for attachment to the inner part and/or the vehicle;
   wherein the outer part includes an accommodating groove that extends along a longitudinal axis with a groove length, the accommodating groove being configured to accommodate the inner part; and
   wherein the inner part is at least partially inserted into the accommodating groove,
   wherein the inner part has an intermediate portion extending along the longitudinal axis between two end portions, the end portions of the inner part being configured for the attachment of the inner part to the vehicle and/or for attachment to the outer part,
   wherein the inner part has an inner-part length along the longitudinal axis, an inner-part width along a transverse axis and an inner-part height along a vertical axis, wherein the inner-part width of the two end portions is, in particular, greater than the inner-part width of the intermediate portion,
   wherein the outer part has an outer-part length along the longitudinal axis, an outer-part width along the transverse axis and an outer-part width along the vertical axis, wherein the outer-part length is greater than the outer-part width, and the outer-part width is greater than an outer-part height, wherein the inner-part width of the two end portions of the inner part is greater than the outer-part width of the outer part.

2. The tread strip according to claim 1, wherein the outer part has an intermediate portion extending along the longitudinal axis between two attachment portions, the two attachment portions being configured for attachment to the inner part.

3. The tread strip according to claim 1, wherein the outer-part length of the outer part is smaller than the inner-part length of the inner part.

4. The tread strip according to claim 1, wherein the inner-part height of the inner part is smaller than the outer-part height of the outer part.

5. The tread strip according to claim 1, wherein the at least two parts of the tread strip include at least one intermediate part, the at least one intermediate part being disposed between the inner part and the outer part.

6. The tread strip according to claim 1, wherein the inner part and the outer part are connected to each other non-positively and/or positively.

7. The tread strip according to claim 1, wherein the inner part is configured as a single part and/or the outer part is configured as a single part.

8. A sliding tread module comprising a mounting frame for accommodating and attaching a sliding tread system to a vehicle, the sliding tread system and a tread strip, wherein the tread strip is configured according to claim 1.

9. A vehicle, comprising a tread strip according to claim 1.

10. A method for mounting a tread strip according to claim 1, comprising at least an inner part and an outer part on a vehicle, the method including the following steps:
   providing the vehicle,
   providing the tread strip,
   attaching the inner part of the tread strip to the vehicle,
   attaching the outer part of the tread strip to the inner part, and
   sealing the inner part with respect to the vehicle.

* * * * *